United States Patent
Sonobe et al.

(10) Patent No.: US 7,983,003 B2
(45) Date of Patent: Jul. 19, 2011

(54) MAGNETIC RECORDING MEDIUM HAVING SOFT MAGNETIC LAYER AND PERPENDICULAR MAGNETIC RECORDING LAYER

(75) Inventors: Yoshiaki Sonobe, Tokyo (JP); Shinichi Ishibashi, Singapore (SG); Masato Kobayashi, Tokyo (JP); Teiichiro Umezawa, Tokyo (JP)

(73) Assignee: WD Media (Singapore) PTE LTD, Singapore (SG)

( * ) Notice: Subject to any disclaimer, the term of this patent is extended or adjusted under 35 U.S.C. 154(b) by 1382 days.

(21) Appl. No.: 11/485,328

(22) Filed: Jul. 13, 2006

(65) Prior Publication Data
US 2007/0053106 A1    Mar. 8, 2007

(30) Foreign Application Priority Data
Jul. 14, 2005    (JP) ................. 2005-205756

(51) Int. Cl.
*G11B 5/82*    (2006.01)
(52) U.S. Cl. .............. 360/135; 369/13.38; 428/827
(58) Field of Classification Search .............. 369/13.38, 369/13.39, 13.06–13.09; 428/817, 821, 831; 360/131, 133, 135
See application file for complete search history.

(56) References Cited

U.S. PATENT DOCUMENTS

| | | | | |
|---|---|---|---|---|
| 4,576,876 A | * | 3/1986 | Shiiki et al. | 428/679 |
| 2002/0136930 A1 | * | 9/2002 | Oikawa et al. | 428/694 TM |
| 2003/0235716 A1 | * | 12/2003 | Kim et al. | 428/694 TM |
| 2005/0181237 A1 | * | 8/2005 | Kitakami et al. | 428/832.1 |
| 2005/0249984 A1 | * | 11/2005 | Ohmori et al. | 428/846.1 |
| 2006/0177701 A1 | * | 8/2006 | Ajan | 428/828.1 |
| 2006/0199043 A1 | * | 9/2006 | Sugimoto et al. | 428/828.1 |
| 2007/0217071 A1 | * | 9/2007 | Inamura et al. | 360/135 |
| 2007/0230051 A1 | * | 10/2007 | Ajan et al. | 360/131 |
| 2007/0230052 A1 | * | 10/2007 | Ajan et al. | 360/131 |
| 2008/0024918 A1 | * | 1/2008 | Gouke | 360/135 |
| 2008/0080093 A1 | * | 4/2008 | Inamura et al. | 360/125.73 |
| 2008/0124579 A1 | * | 5/2008 | Kaitsu et al. | 428/800 |
| 2008/0226950 A1 | * | 9/2008 | Oikawa et al. | 428/832.1 |

FOREIGN PATENT DOCUMENTS

| | | |
|---|---|---|
| JP | 61-5428 A | 1/1986 |
| JP | S61-73226 A | 4/1986 |
| JP | 2002-269731 A | 9/2002 |
| JP | 2003-099912 A | 4/2003 |
| JP | 2003-187413 A | 7/2003 |
| JP | 2004-118977 A1 | 4/2004 |
| JP | 2004-335068 A | 11/2004 |

OTHER PUBLICATIONS

Japanese Office Action dated Jul. 28, 2009.

* cited by examiner

*Primary Examiner* — Tan X Dinh (57) ABSTRACT

A perpendicular magnetic recording medium 10 adapted to be mounted in a perpendicular magnetic recording type hard disk drive and including a disk-shaped disk base 12, a soft magnetic layer 14 formed on the disk base 12, and a perpendicular magnetic recording layer 16 formed on the soft magnetic layer 14, wherein, at respective portions of the soft magnetic layer 14, directional distribution of easy magnetization axes of magnetic particles included In each of the respective portions is isotropic with respect to respective directions in the main surface of the soft magnetic layer 14.

5 Claims, 5 Drawing Sheets

MAGNETIC RECORDING MEDIUM HAVING SOFT MAGNETIC LAYER AND PERPENDICULAR MAGNETIC RECORDING LAYER

This application claims priority to prior Japanese patent application JP 2005-205756, the disclosure of which is incorporated herein by reference.

BACKGROUND OF THE INVENTION

This invention relates to a perpendicular magnetic recording medium adapted to be mounted in a perpendicular magnetic recording type hard disk drive.

The information-oriented society in recent years has continued the rapid advance and the information recording capacity exceeding 80 Gbytes has been required per 2.5-inch magnetic disk in magnetic recording apparatuses represented by HDDs (hard disk drives). In order to satisfy such a requirement in the magnetic disk, it is necessary to realize an information recording density exceeding 133 Gbits per inch$^2$ (133 Gbits/inch$^2$).

Since high recording resolution can be obtained, the perpendicular magnetic recording system composed of a perpendicular two-layer medium having a soft magnetic layer and a single-pole head has been studied and developed as a next-generation high-density recording system.

In such a perpendicular magnetic recording system, it has been an aim to reduce noise caused by the soft magnetic layer. For example, in Japanese Unexamined Patent Application Publication (JP-A) No. S61-5428 (Patent Document 1), determining that noise is mainly caused by a soft magnetic layer, the directions of domain walls and easy magnetization axes of the soft magnetic layer are aligned with the recording track direction, thereby improving S/N, Further, Japanese Unexamined Patent Application Publication (JP-A) No. 2003-187413 (Patent Document 2) describes that domain walls are formed due to the thickness of a soft magnetic backing layer and spike noise caused by reading, with a head, leakage magnetic flux from the domain walls is a problem to be solved. This Patent Document 2 discloses a perpendicular magnetic recording medium that can easily orient easy magnetization axes of the soft magnetic layer (soft magnetic backing layer) in a certain direction, which has conventionally been carried out, so as to eliminate the domain walls that cause the spike noise. That is, a ferromagnetic layer is formed on a substrate using a material in which easy magnetization axes are oriented in the radial or circumferential direction and, further, an antiferromagnetic layer is formed between the ferromagnetic layer and the soft magnetic layer. It is described that this makes it possible to give a radial magnetic anisotropy to the soft magnetic backing layer without applying thereto a heat treatment in a magnetic field or a treatment during magnetization.

Not only in the techniques of the foregoing Patent Documents 1 and 2, but in magnetic recording media having a soft magnetic layer, it has been the aim to reduce noise caused by the soft magnetic layer and it has been an established theory (common sense) that, in order to achieve the aim, easy magnetization axes of the soft magnetic layer should be aligned in a fixed direction. Particularly, in the case of a substrate like a magnetic disk, it has been believed that aligning easy magnetization axes of a soft magnetic layer radially in radial directions from the center of the substrate is the most desirable state for preventing generation of spike noise caused by domain walls of the soft magnetic layer. This is because if a domain wall, i.e. a region where magnetization is inverted, exists in the circumferential direction, a reproducing head detects this inversion of magnetization upon passing through this region, which becomes spike noise. On the other hand, even if a region, where magnetization is inverted, exists in the radial direction, since this differs from the detection direction of the reproducing head by 90 degrees, the head cannot detect it and thus no noise is caused. Therefore, it has been considered best to align the easy magnetization axes of the soft magnetic layer radially in the radial directions from the center of the substrate.

As described above, in the magnetic disk, the magnetic anisotropy is provided radially in order to reduce noise such as spike noise caused by the soft magnetic layer. In order to provide such a magnetic anisotropy, a process is provided wherein, in the state where the substrate is heated after the formation of the soft magnetic layer, the directions of easy magnetization axes are aligned in the radial directions while applying external magnetization in point symmetry with respect to the center of the substrate, a complicated process such as a heat treatment or application of a bias is carried out, or additional layers are formed for aligning the directions of easy magnetization axes like in the technique described in Patent Document 2. Therefore, since process chambers and mechanisms should be prepared for heating the substrate and applying the particular magnetic field and a lot of time is required, there arise problems such as a reduction in productivity/an increase in cost. Particularly, when soft magnetic layers are simultaneously formed with respect to a plurality of small-diameter substrates (disk bases), control of the magnetic field becomes complicated and hence the problems of reduction in productivity/increase in cost are made greater.

SUMMARY OF THE INVENTION

Therefore, it is an object of this invention to provide a perpendicular magnetic recording medium that can solve the foregoing problems.

The present inventors have advanced studies for solving the foregoing problems and, as a result, have found that domain walls disappear when easy magnetization axes of a soft magnetic layer are randomly oriented. Accordingly, when the easy magnetization axes of the soft magnetic layer were randomly oriented intentionally, a head did not detect noise and thus the properties were excellent. Based on this knowledge, the present inventors have adopted not to orient the easy magnetization axes of the soft magnetic layer in the radial directions as in the conventional technique, but to orient them randomly, and have completed the following invention. For solving the foregoing problems, this invention has the following structures.

(Structure 1)

A perpendicular magnetic recording medium adapted to be mounted in a perpendicular magnetic recording type hard disk drive, said perpendicular magnetic recording medium characterized by comprising a disk-shaped disk base, a soft magnetic layer formed on said disk base, and a perpendicular magnetic recording layer formed on said soft magnetic layer, wherein, at respective portions of said soft magnetic layer, directional distribution of easy magnetization axes of magnetic particles included in each of said respective portions is isotropic with respect to respective directions in a main surface of said soft magnetic layer.

Such a soft magnetic layer is, for example, a soft magnetic layer having easy magnetization axes that are controlled in-plane randomly in the main surface. With this configuration, since domain walls of the soft magnetic layer disappear, spike noise otherwise caused by domain walls is not detected:

Therefore, when configured as described above, it is possible to reduce noise such as spike noise caused by the soft magnetic layer. Note that "domain walls disappear" is not necessarily limited to a case where domain walls disappear in atomic-level observation, but, for example, may include a case where domain walls that raise a problem in the range of detection accuracy of a head are eliminated.

Further, when configured as described above, since, for example, the soft magnetic layer may be formed while applying a random magnetic field, control of easy magnetization axes of the soft magnetic layer is facilitated, for example, as compared with the case where easy magnetization axes of the soft magnetic layer are oriented in a specific direction such as in radial directions. Accordingly, the problems of reduction in productivity/increase in cost and so on do not tend to occur. Particularly, when soft magnetic layers are simultaneously formed with respect to a plurality of disk bases, by controlling easy magnetization axes of the respective small-diameter substrates to be in-plane random, it is possible to form the soft magnetic layers capable of suppressing spike noise without impeding the mass-productivity.

Herein, the respective portions of the soft magnetic layer are each a portion, for example, having a size equivalent to a read range of the head. The directional distribution of the easy magnetization axes may be isotropic, for example, in the range of detection accuracy of the head. The directional distribution of the easy magnetization axes being isotropic represents that, for example, there is no substantial difference in magnetic properties with respect to the respective directions in the main surface at each of the respective portions within a variation range of the magnetic properties over the entire soft magnetic layer.

(Structure 2)

A magnetic hysteresis loop in each of said respective portions of said soft magnetic layer is isotropic with respect to a magnetic field in radial directions and a magnetic field in a circumferential direction of said disk base. The magnetic hysteresis loop in each of the respective portions may be isotropic with respect to magnetic fields of the respective directions in the main surface of the soft magnetic layer.

With this configuration, domain walls of the soft magnetic layer can be properly eliminated. The magnetic hysteresis loop may be isotropic, for example, in the range of detection accuracy of the head. The magnetic hysteresis loop being isotropic represents that, for example, there is no substantial difference in properties within a variation range of the magnetic properties over the entire soft magnetic layer.

(Structure 3)

When light is irradiated onto a surface of said soft magnetic layer for forming a pattern by a magnetic Kerr effect, said pattern on the whole of the surface of said soft magnetic layer becomes a single region that is not divided by a boundary line showing a domain wall.

According to the magnetic Kerr effect, it is possible to detect a magnetic domain and a domain wall having a size equal to or greater than that corresponding to a wavelength of irradiated light. The soft magnetic layer may have domain walls each having a size that cannot be detected by the magnetic Kerr effect.

By the use of the soft magnetic layer having such properties, it is possible to properly reduce noise such as spike noise. Note that the whole of the surface of the soft magnetic layer represents, for example, the whole of a region relating to recording of information onto the perpendicular magnetic recording medium. The region relating to recording of information onto the perpendicular magnetic recording medium represents, for example, a region where the flow of magnetic flux from the head is adapted to pass when information is recorded onto the perpendicular magnetic recording layer. Further, the whole of the surface of the soft magnetic layer may be the whole of the surface of the soft magnetic layer on one of the main surfaces of the disk base.

(Structure 4)

A size of a magnetic domain in said soft magnetic layer is a size that allows at least two magnetic domains to be located in a gap of a reproducing head used in said hard disk drive. With this configuration, it is possible to substantially eliminate domain walls that raise a problem in the range of detection accuracy of the head. Thus, spike noise otherwise caused by domain walls is not detected by the head. And, it is possible to properly reduce noise caused by the soft magnetic layer.

The size of a magnetic domain in the soft magnetic layer represents, for example, the average size of magnetic domains over the entire region relating to recording of information onto the perpendicular magnetic recording medium. The reproducing head has, for example, a gap of approximately 0.05 to 0.1 µm. The soft magnetic layer has preferably 10 or more magnetic domains and more preferably 100 or more magnetic domains in the gap. The soft magnetic layer may have, for example, 2 to 10, 10 to 100, or 100 to 1000 magnetic domains in the gap.

(Structure 5)

The soft magnetic layer is formed so that hard magnetization axes are oriented in a direction perpendicular to said main surface. If magnetization of the soft magnetic layer includes a perpendicular component, there is a case where it becomes a noise source with respect to information recorded on the perpendicular magnetic recording layer. However, when configured in this manner, the easy magnetization axes of the soft magnetic layer are, for example, oriented in-plane randomly (two-dimensional randomly) in the main surface. Therefore, with this configuration, it is possible to further reduce noise caused by the soft magnetic layer.

BRIEF DESCRIPTION OF THE DRAWINGS

FIGS. 2A and 2B are diagrams for explaining one example of a soft magnetic layer forming method, wherein FIGS. 3A to 3C are diagrams showing examples of the results obtained by observing the surfaces of soft magnetic layers in terms of the magnetic Kerr effect, wherein FIGS. 4A and 4B are diagrams showing examples of the magnetic properties of soft magnetic layers, respectively, wherein

DESCRIPTION OF THE PREFERRED EMBODIMENTS

Hereinbelow, embodiments according to this invention will be described with reference to the drawings.

Figure 1:
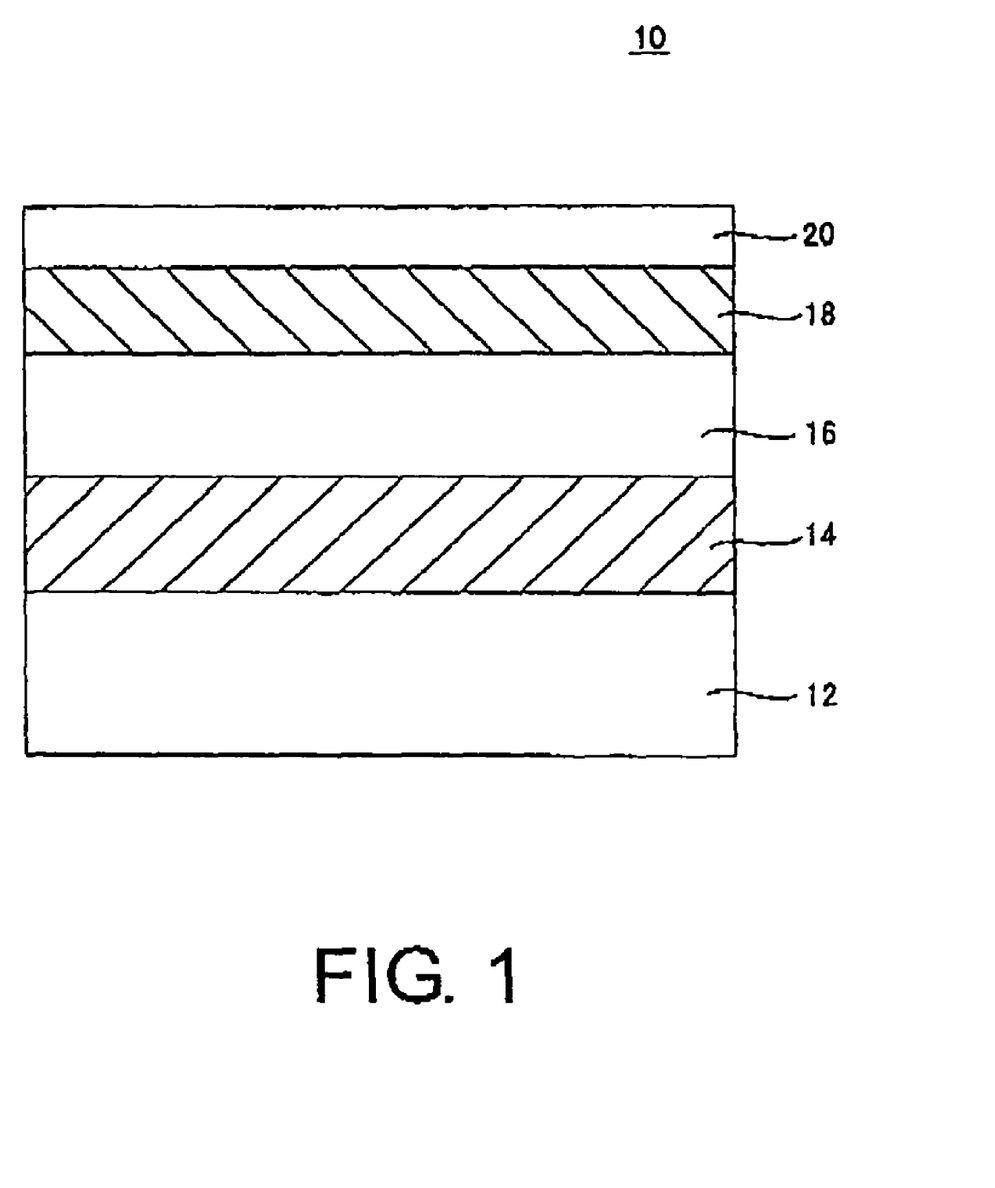
FIG. 1 is a diagram showing a first example of the structure of a perpendicular magnetic recording medium according to an embodiment of this invention.

FIG. 1 shows a first example of the structure of a perpendicular magnetic recording medium 10 according to one embodiment of this invention. The perpendicular magnetic recording medium 10 is a magnetic disk adapted to be mounted in a perpendicular magnetic recording type hard disk drive and comprises a disk base 12, a soft magnetic layer 14, a perpendicular magnetic recording layer 16, a protective layer 18, and a lubricating layer 20 in the order named. The disk base 12 is a disk-shaped glass substrate and is made of an aluminosilicate glass, an aluminoborosilicate glass, a soda lime glass, or the like. The disk base 12 is preferably a glass substrate formed with no texture adapted to control easy magnetization axes of the upper layer. The disk base 12 may have a donut-type disk shape.

The soft magnetic layer 14 is a layer for adjusting a magnetic circuit of the perpendicular magnetic recording layer 16 and is formed on the disk base 12 so as to face a head of the hard disk drive through the perpendicular magnetic recording layer 16 interposed therebetween. The soft magnetic layer 14 is not particularly limited as long as it is made of a magnetic substance that exhibits soft magnetic properties (SUL: Soft Underlayer), and has as a magnetic property a coercive force (Hc) of, for example, 0.01 to 80 oersteds and more preferably 0.01 to 50 oersteds. Further, it preferably has as a magnetic property a saturation magnetic flux density (Bs) of 500 emu/cc to 1920 emu/cc. As a material of the soft magnetic layer 14, there can be cited an Fe-based material, a Co-based material, or the like. For example, use can be made, as the material of the soft magnetic layer 14, of an Fe-based soft magnetic material such as FeTaC-based alloy, FeTaN-based alloy, FeNi-based alloy, FeCoB-based alloy, or FeCo-based alloy, a Co-based soft magnetic material such as CoTaZr-based alloy or CoNbZr-based alloy, an FeCo-based alloy soft magnetic material, or the like.

The thickness of the soft magnetic layer 14 is, for example, 30 nm to 100 nm and desirably 50 nm to 200 nm. When it is less than 30 nm, there is a case where it becomes difficult to form a suitable magnetic circuit between the head/the perpendicular magnetic recording layer 16/the soft magnetic layer 14, while, when it exceeds 1000 nm, there is a case where the surface roughness increases. Further, when it exceeds 1000 nm, there is a case where the sputtering film formation becomes difficult.

The perpendicular magnetic recording layer 16 is a magnetic recording layer having easy magnetization axes in a direction perpendicular to the main surface. The perpendicular magnetic recording layer 16 is formed on the soft magnetic layer 14 using, for example, a Co-based alloy such as CoCrPt. The protective layer 18 is a layer for protecting the perpendicular magnetic recording layer 16 from an impact by the head. The lubricating layer 20 is a layer for increasing lubricity between the head and the perpendicular magnetic recording medium 10.

As a method of manufacturing the respective layers of the perpendicular magnetic recording medium 10, it is preferable to form them by the sputtering method. Particularly, the DC magnetron sputtering method is preferable because uniform film formation is enabled. The perpendicular magnetic recording medium 10 may be further provided with another layer such as, for example, an adhesion layer or an underlayer between the disk base 12 and the soft magnetic layer 14 or between the soft magnetic layer 14 and the perpendicular magnetic recording layer 16. The perpendicular magnetic recording medium 10 may be provided with a plurality of soft magnetic layers 14 that are antiferromagnetically coupled to each other through a Ru layer, an Ir layer, a Rh layer, or the like interposed therebetween.

Figure 2A:
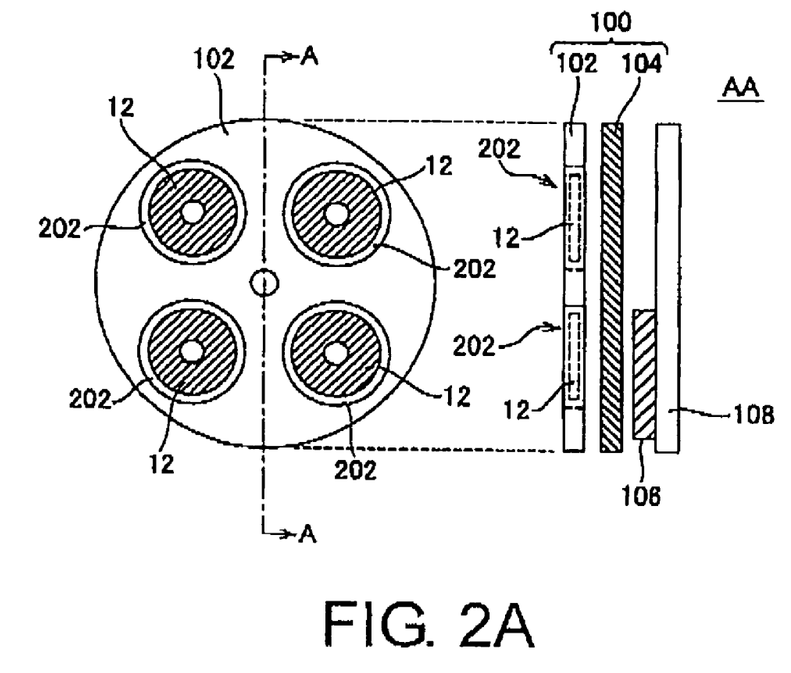
FIG. 2A shows one example of the structure of a film forming apparatus and FIG. 2B shows the movement of a rotary magnet driven by a magnet rotation stage.
Figure 2B:
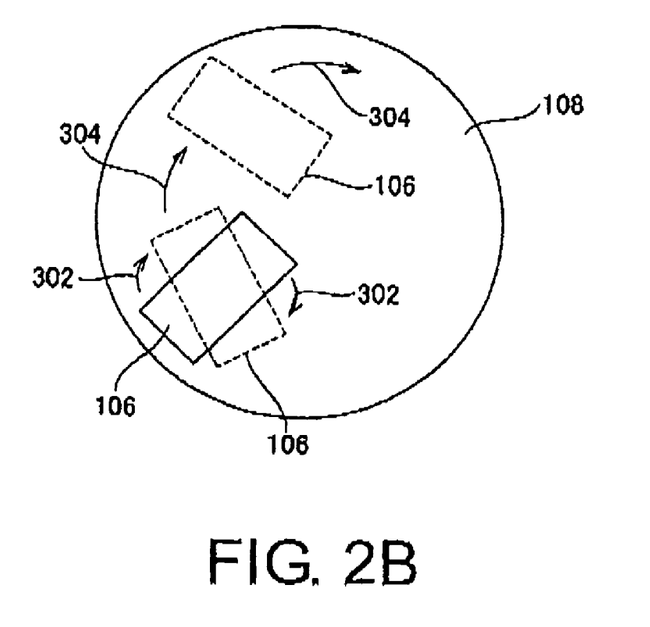

FIGS. 2A and 2B show one example of a method of forming the soft magnetic layer 14. In this example, the disk base 12 is a disk-shaped member having a small diameter of, for example, 1 inch or 0.85 inches. Soft magnetic layers 14 are simultaneously formed with respect to a plurality of disk bases 12 by the use of a film forming apparatus 100.

FIG. 2A shows one example of the structure of the film forming apparatus 100. The film forming apparatus 100 is a DC magnetron sputtering apparatus and comprises a substrate adapter 102, a target 104, a rotary magnet 106, and a magnet rotation stage 108. The substrate adapter 102 has a plurality of substrate receiving portions 202 in the form of through-holes and receives the disk bases 12 in the substrate receiving portions 202, respectively. By this, the substrate adapter 102 holds the plurality of disk bases 12 with their film-forming surfaces facing the target 104. The target 104 is a target for supplying a film material of the soft magnetic layers 14. The rotary magnet 106 is a magnet for generating a magnetic field necessary for the DC magnetron sputtering method and is rotatably held by the magnet rotation stage 108. The magnet rotation stage 108 is a drive apparatus for rotationally driving the rotary magnet 106. In this example, the magnet rotation stage 108 rotationally drives the rotary magnet 106 so that the magnetic field applied to the respective disk bases 12 is not biased in a particular direction.

FIG. 2B shows the movement of the rotary magnet 106 driven by the magnet rotation stage 108. The magnet rotation stage 108 rotates the rotary magnet 106 with respect to the center of the magnet rotation stage 108 as shown by arrows 304 while rotating the rotary magnet 106 on its axis as shown by arrows 302. With this configuration, the direction and strength of the magnetic field at positions of the respective disk bases 12 constantly change. Further, the time average of the magnetic field applied to respective portions of each disk base 12 becomes isotropic with respect to the respective directions in the main surface. Therefore, there is no possibility that easy magnetization axes of the formed soft magnetic layer 14 are each oriented in a certain fixed direction. And, the magnetic properties of the formed soft magnetic layer 14 become isotropic with respect to the respective directions in the main surface. Further, hard magnetization axes are oriented in a direction perpendicular to the main surface of the soft magnetic layer 14. Therefore, when the soft magnetic layer 14 is formed by the method as described above, the easy magnetization axes are not aligned in the radial directions or the like, but are controlled in-plane randomly.

When the easy magnetization axes are randomly oriented, the head cannot detect noise and hence it is possible to reduce noise such as spike noise caused by the soft magnetic layer 14. Further, as compared to the case of orienting the easy magnetization axes in the specific directions, the easy magnetization axes of the soft magnetic layer can be easily controlled. Accordingly, the formation of the soft magnetic layer 14 capable of suppressing the spike noise is enabled without impeding the mass-productivity.

Except the foregoing, the soft magnetic layer 14 is formed by a method that is, for example, the same as or similar to a conventionally known method. The respective layers, other than the soft magnetic layer 14, in the perpendicular magnetic recording medium 10 (see FIG. 1) can also be formed by the method that is the same as or similar to the conventionally known method. The film forming apparatus 100 may be provided with a plurality of rotary magnets 106. For example, soft magnetic layers 14 may be simultaneously formed on both sides of disk bases 12 by the use of two sets of targets 104, rotary magnets 106, and magnet rotation stages 108.

Figure 3A:
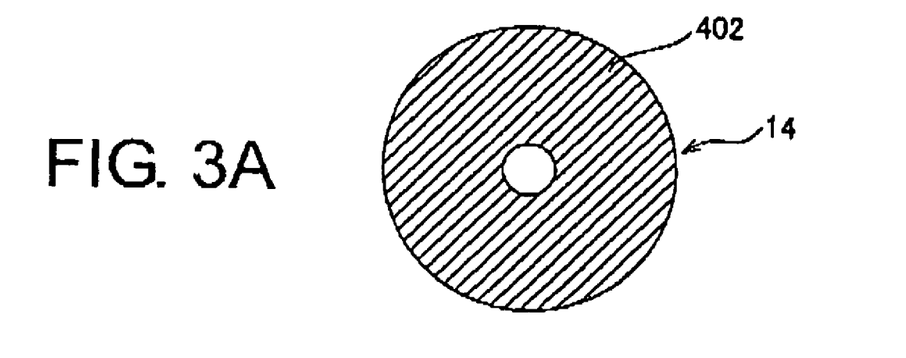
FIG. 3A shows one example of a pattern caused by the magnetic Kerr effect in the case where the soft magnetic layer is properly formed and FIGS. 3B and 3C each show one example of a pattern in the case where the soft magnetic layer is not properly formed.
Figure 3B:
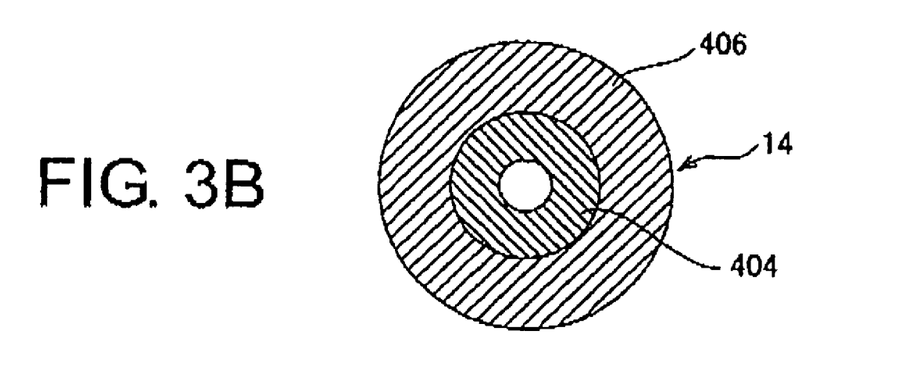
Figure 3C:
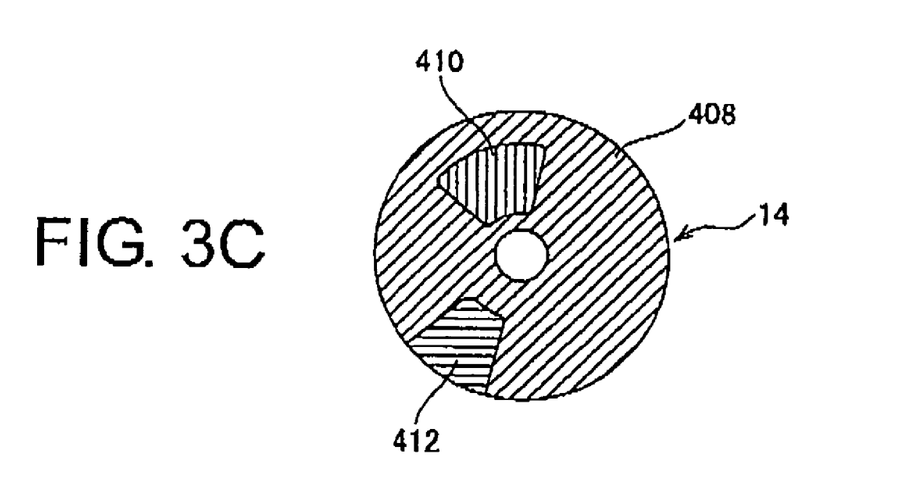

FIGS. 3A to 3C show examples of the results obtained by observing the surfaces of soft magnetic layers 14 in terms of the magnetic Kerr effect. The magnetic Kerr effect of the soft magnetic layer 14 is measured, for example, by irradiating laser light having a wavelength of 250 to 900 nm. The magnetic Kerr effect can be measured, for example, by an ellipsometer mounted in an optical surface analyzer manufactured by Candela Instruments, Inc. The magnetic Kerr effect of the soft magnetic layer 14 can be measured, for example, before the formation of the upper layers, i.e. the perpendicular magnetic recording layer 16 and so on. On the other hand, it can be measured after the completion of the perpendicular magnetic recording medium 10 by stripping the upper layers, i.e. the perpendicular magnetic recording layer 16 and so on.

FIG. 3A shows one example of a pattern caused by the magnetic Kerr effect in the case where the soft magnetic layer 14 is properly formed. In this case, the whole pattern on the surface of the soft magnetic layer 14 becomes a single and uniform region 402 that is not divided by boundary lines showing domain walls.

FIGS. 3B and 3C each show one example of a pattern in the case where the soft magnetic layer 14 is not properly formed. When there is deviation in the range of the movement of the rotary magnet 106 (see FIG. 2B) in the film forming apparatus 100 (see FIG. 2A) or when the speed of the rotation on its axis or the orbital rotation of the rotary magnet 106 is insufficient, there is a case where boundary lines showing domain walls appear to divide the pattern into a plurality of regions 404 to 412. If regions having sizes unignorable as compared with the size of the head are formed, spike noise or the like is generated due to domain walls between the regions. In such a case, proper formation of a soft magnetic layer 14 is enabled by properly adjusting the position or size of the rotary magnet 106 or the operation of the magnet rotation stage 108.

For example, as shown in FIG. 3B, when there is observed the pattern divided into the region 404 at the inner peripheral portion and the region 406 at the outer peripheral portion, it is effective to move the position of the rotary magnet 106 to the inner peripheral side or use a larger rotary magnet 106. On the other hand, as shown in FIG. 3C, when the pattern is divided into the regions 410 and 412 surrounded by domain walls extending in the radial directions and the other region 408, it is effective to increase the speed of the rotation on its axis or the orbital rotation of the rotary magnet 106.

The soft magnetic layer 14 may have magnetic domains each having a size that is not observed by the magnetic Kerr effect. In this case, the size of each magnetic domain in the soft magnetic layer 14 is preferably a size that allows at least two (preferably 10 or more and more preferably 100 or more) magnetic domains to be located in a gap of a reproducing head used in a hard disk drive. With this configuration, it is possible to substantially eliminate domain walls that raise a problem in the range of detection accuracy of the head.

Figure 4A:
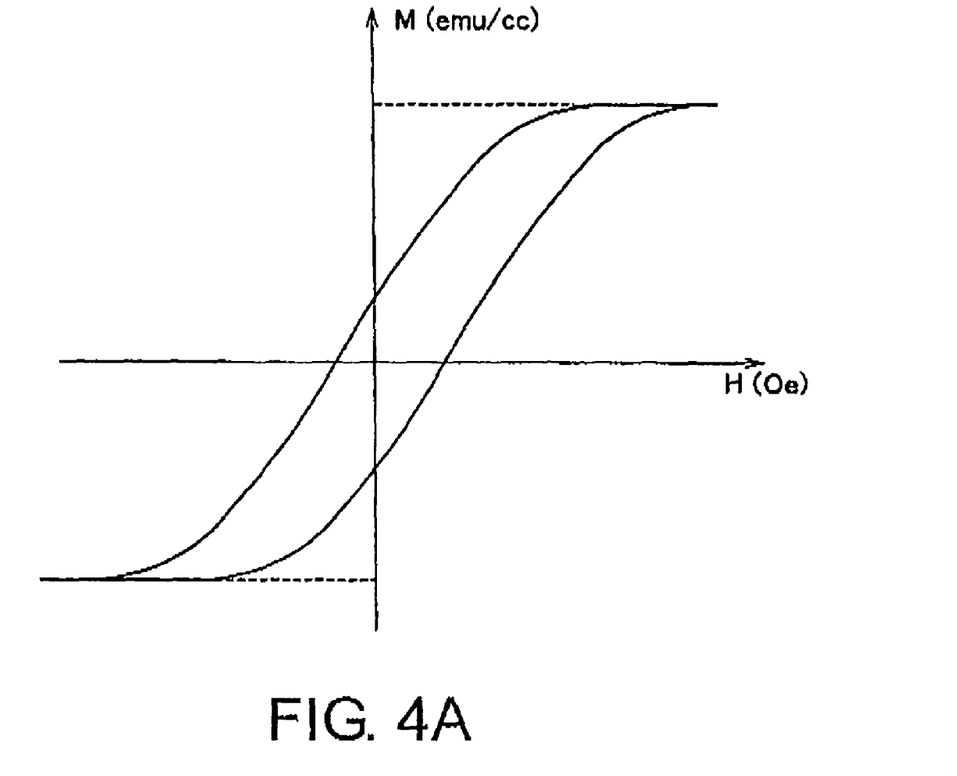
FIG. 4A shows one example of magnetic hysteresis loops measured at respective portions of the soft magnetic layer and FIG. 4B is a reference view showing a magnetic hysteresis loop of the soft magnetic layer when a uniaxial anisotropy appears.
Figure 4B:
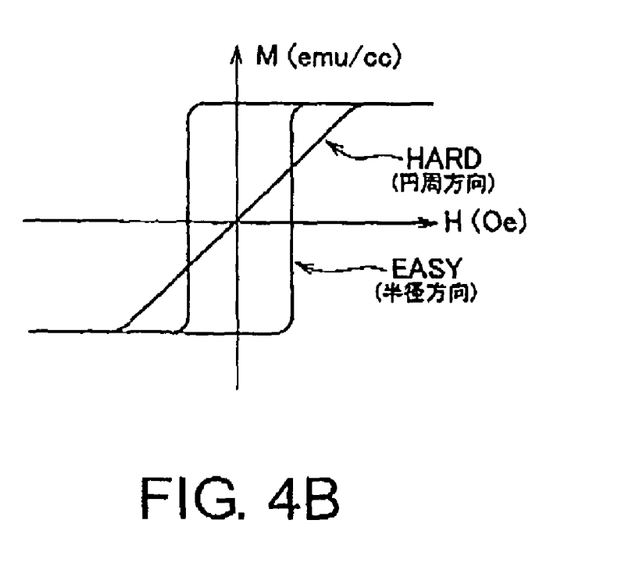

FIGS. 4A and 4B show examples of the magnetic properties of soft magnetic layers 14, respectively. FIG. 4A shows one example of magnetic hysteresis loops measured at respective portions of the soft magnetic layer 14. The magnetic hysteresis loop can be measured, for example, by the use of a known MH loop tracer or the like.

In this example, easy magnetization axes of the soft magnetic layer 14 are controlled in-plane randomly. Therefore, the magnetic hysteresis loops at the respective portions of the soft magnetic layer 14 each become isotropic with respect to magnetic fields of respective directions in the main surface. Accordingly, for example, the magnetic hysteresis loops with respect to the respective magnetic fields in the radial and circumferential directions of the disk base 12 each become the same as that shown in FIG. 4A. Further, as seen from the pattern of the magnetic Kerr effect shown in FIG. 3A, even if measured at any portions of the soft magnetic layer 14, the magnetic hysteresis loops become the same as each other within a predetermined variation range.

When the soft magnetic layer 14 having such magnetic properties is used, since no domain wall exists in the soft magnetic layer 14, spike noise otherwise caused by domain walls is not detected. Therefore, it is possible to reduce noise such as spike noise caused by the soft magnetic layer 14. When there are a plurality of soft magnetic layers 14 that are antiferromagnetically coupled to each other, it is desirable that each of magnetic hysteresis loops at respective portions of at least the uppermost soft magnetic layer 14 be isotropic.

FIG. 4B is a reference view showing a magnetic hysteresis loop of a soft magnetic layer when a uniaxial anisotropy appears. When easy magnetization axes are not randomly controlled, but are aligned In a certain direction, a uniaxial anisotropy appears and hence magnetic hysteresis loops differ between easy magnetization axes and hard magnetization axes. For example, when easy magnetization axes are aligned in the radial directions of the disk base, the circumferential direction becomes a direction of hard magnetization axes. In this case, magnetic hysteresis loops at respective portions of the soft magnetic layer each become anisotropic with respect to a magnetic field in the radial directions and a magnetic field in the circumferential direction of the disk base. Therefore, for example, by measuring the magnetic hysteresis loops with respect to the magnetic fields in the radial and circumferential directions of the disk base, it is possible to properly distinguish between the perpendicular magnetic recording medium 10 of this example and the perpendicular magnetic recording medium having the soft magnetic layer with the aligned easy magnetization axes.

Figure 5:
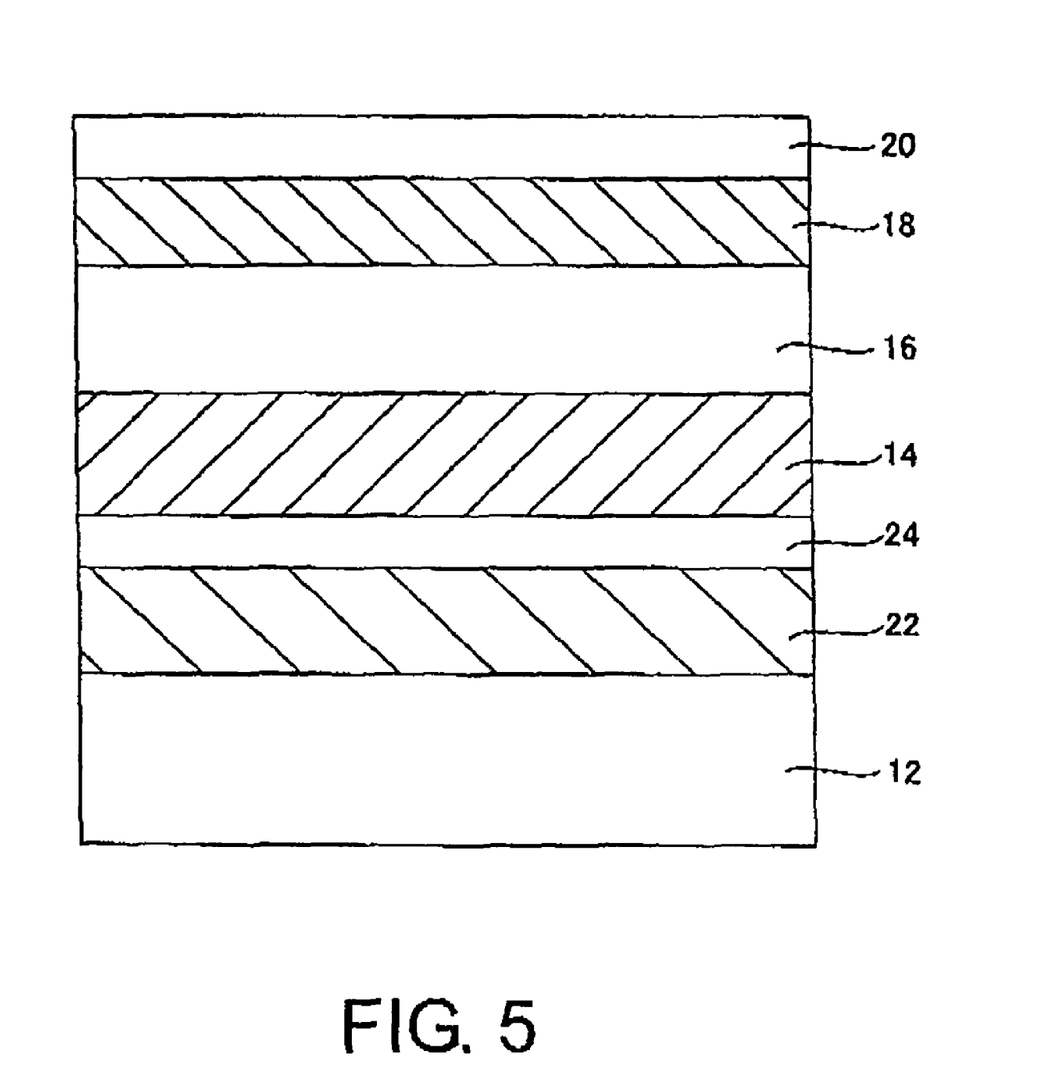
FIG. 5 is a diagram showing a second example of the structure of a perpendicular magnetic recording medium.

FIG. 5 shows a second example of the structure of a perpendicular magnetic recording medium 10. Except what will be described hereinbelow, explanation is omitted with respect to the same or similar structure as that in FIG. 1 by assigning the same symbols as those in FIG. 1. In this example, the perpendicular magnetic recording medium 10 comprises a disk base 12, a hard magnetic layer 22, a nonmagnetic layer 24, a soft magnetic layer 14, a perpendicular magnetic recording layer 16, a protective layer 18, and a lubricating layer 20 in the order named.

The disk base 12 is a substrate formed with no texture adapted to control easy magnetization axes of the upper layer. The hard magnetic layer 22 is a film made of a hard magnetic material such as a Co-based ferromagnetic substance, for example, CoCrPt, CoCrTa, CoCrNb, or the like, and is formed, for example, by the DC magnetron sputtering method. When configured in this manner, the hard magnetic layer 22 is formed while having no magnetic anisotropy in the in-main-surface directions. Therefore, in the hard magnetic layer 22, the magnetic properties become isotropic with respect to the respective directions in the main surface.

The nonmagnetic layer 24 is a layer for antiferromagnetic coupling between the hard magnetic layer 22 and the soft magnetic layer 14. As a material of the nonmagnetic layer 24, it is preferable to use, for example, Ru, Ir, Rh, or the like. The soft magnetic layer 14 is formed on the hard magnetic layer 22 through the nonmagnetic layer 24 interposed therebetween.

When, in the manner as described above, the soft magnetic layer 14 is formed on the hard magnetic layer 24 by the DC magnetron sputtering method, easy magnetization axes of the hard magnetic layer 16 are oriented in directions corresponding to easy magnetization axes of the hard magnetic layer 22 due to the antiferromagnetic coupling. Accordingly, even without driving of the rotary magnet 106 (see FIGS. 2A and 2B) or the like, the magnetic properties of the soft magnetic layer 14 become isotropic with respect to the respective directions in the main surface. Therefore, also in the case thus configured, it is possible to properly form the soft magnetic layer 14 having the easy magnetization axes controlled in-plane randomly. By this, it is possible to properly reduce noise such as spike noise caused by the soft magnetic layer 14.

This invention can be suitably applied, for example, to a perpendicular magnetic recording medium adapted to be mounted in a perpendicular magnetic recording type hard disk drive.

According to this invention, there is obtained a perpendicular magnetic recording medium that can reduce noise such as spike noise caused by a soft magnetic layer. Further, according to this invention, there is obtained a perpendicular magnetic recording medium manufacturing method that is high in productivity and thus can reduce the cost.

While this invention has been described in terms of the embodiments, the technical scope of the invention is not limited to the scope of the description of the foregoing embodiments. It is obvious to a person skilled in the art that various changes or improvements can be added to the foregoing embodiments. It is clear from the description of claims that the modes added with such changes or improvements can also be included in the technical scope of this invention.

What is claimed is:

1. A perpendicular magnetic recording medium adapted to be mounted in a perpendicular magnetic recording type hard disk drive, said perpendicular magnetic recording medium comprising:

a disk-shaped disk base, a soft magnetic layer formed on said disk base, said soft magnetic layer having magnetic particles with easy magnetization axes and hard magnetization axes with the easy magnetization axes of the soft magnetic layer being randomly oriented in-plane with the disk base; and a perpendicular magnetic recording layer formed on said soft magnetic layer, wherein, at respective portions of said soft magnetic layer, directional distribution of the easy magnetization axes of the magnetic particles included in each of said respective portions is isotropic with respect to respective directions in a main surface of said soft magnetic layer; and wherein a magnetic hysteresis loop in each of said respective portions of said soft magnetic layer is isotropic with respect to a magnetic field in radial directions and a magnetic field in a circumferential direction of said disk base.

2. A perpendicular magnetic recording medium according to claim 1, wherein when light is irradiated onto a surface of said soft magnetic layer for forming a pattern by a magnetic Kerr effect, said pattern on the whole of the surface of said soft magnetic layer becomes a single region that is not divided by a boundary line showing a domain wall.

3. A perpendicular magnetic recording medium according to claim 1, wherein a size of a magnetic domain in said soft magnetic layer is a size that allows at least two magnetic domains to be located in a gap of a reproducing head used in said hard disk drive.

4. A method of manufacturing a perpendicular magnetic recording medium comprising a disk base, a soft magnetic layer formed on said disk base, and a perpendicular magnetic recording layer formed on said soft magnetic layer, the method comprising a film forming step of forming said soft magnetic layer while applying a magnetic field to said disk base, wherein said magnetic field is applied so that easy magnetization axes of said soft magnetic layer are oriented in-plane randomly in a main surface of said soft magnetic layer;

wherein said film forming step comprises a step of rotatably attaching to a magnet rotation stage a magnet adapted to generate said magnetic field and a step of rotating said magnet rotation stage so that a magnetic property of said soft magnetic layer becomes isotropic with respective directions in the main surface of said soft magnetic layer.

5. A method of manufacturing a perpendicular magnetic recording medium according to claim 4, wherein said step of rotating said magnet rotation stage rotates said magnet with respect to a center of said magnet rotation stage and simultaneously rotates said magnet on its axis, thereby obtaining the magnetic property of said soft magnetic layer that is isotropic with respect to the respective directions in the main surface of said soft magnetic layer.

* * * * *